US012710067B1

(12) United States Patent
Ruh et al.

(10) Patent No.: US 12,710,067 B1
(45) Date of Patent: Aug. 18, 2026

(54) FASTENER FOR TEMPORARILY SECURING COMPONENTS

(71) Applicant: Blue Origin Manufacturing, LLC, Huntsville, AL (US)

(72) Inventors: Anthony Ruh, Washington, DC (US); Cameron Crow, Renton, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 19/260,150

(22) Filed: Jul. 3, 2025

(51) Int. Cl.
*F16B 13/08* (2006.01)

(52) U.S. Cl.
CPC ................................ *F16B 13/0808* (2013.01)

(58) Field of Classification Search
CPC ...... F16B 13/002; F16B 13/02; F16B 13/045; F16B 13/061; F16B 13/0808; F16B 13/124; F16B 13/126; F16B 19/1063; F16B 19/1081; F16B 19/109; F16B 2/243; F16B 21/02; F16B 21/08; F16B 21/084; F16B 29/00; F16B 35/041; F16B 37/00; F16B 39/282
See application file for complete search history.

(56) References Cited

U.S. PATENT DOCUMENTS

| | | | |
|---|---|---|---|
| 2,150,080 | A | 3/1939 | Rawlings |
| 3,480,306 | A | 11/1969 | Hsu |
| 3,832,931 | A | 9/1974 | Talan |
| 4,088,054 | A | 5/1978 | Lippacher et al. |
| 4,135,432 | A | 1/1979 | Schalge et al. |
| 4,182,218 | A | 1/1980 | Combette et al. |
| 4,197,781 | A | 4/1980 | Giannuzzi |
| 5,655,864 | A | 8/1997 | Haage et al. |
| 2009/0220299 | A1 | 9/2009 | Hawang |
| 2019/0093337 | A1 | 3/2019 | Cabaj et al. |
| 2019/0162222 | A1 * | 5/2019 | Vovan ................ F16B 19/1072 |
| 2023/0109381 | A1 | 4/2023 | Hill |

FOREIGN PATENT DOCUMENTS

| | | |
|---|---|---|
| AU | 4210178 | 6/1980 |
| DE | 1230265 | 12/1966 |
| DE | 20 2012 100 346 | 6/2013 |
| DE | 10 2012 100 857 A1 | 5/2015 |
| EP | 1 801 430 A2 | 6/2007 |
| GB | 2562446 A | 11/2018 |
| KR | 2018-0086845 | 8/2018 |
| WO | WO 2015/044940 A1 | 4/2015 |

OTHER PUBLICATIONS

Stockman, Bill, et al. "International Space Station Systems Engineering. Case Study." (2010).

* cited by examiner

*Primary Examiner* — Lee A Holly
(74) *Attorney, Agent, or Firm* — Knobbe, Martens, Olson & Bear, LLP

(57) ABSTRACT

Toggle bolts are disclosed herein. In one aspect, a fastener configured to temporarily secure a component to a support structure during installation of the component. The fastener includes a proximal portion configured to selectively engage and disengage a hole in the support structure. The fastener also has an intermediate portion having a plurality of retention arms. Each of the retention arms is configured to transition between a resting configuration and a compressed configuration. The fastener also includes a distal portion configured to guide traversal of the fastener through the hole in the component.

18 Claims, 5 Drawing Sheets

314
316
214
216
200
212
210
218
220
308
208
302
304

FASTENER FOR TEMPORARILY SECURING COMPONENTS

BACKGROUND

Field

The described technology relates generally to fasteners, and in particular, fasteners which can be used to temporarily secure components.

Description of the Related Technology

The installation of components often involves securing the components to a support structure using one or more fasteners. Commonly, bolts are inserted through holes in a component and threaded into a tapped surface of the support structure, thereby securing the component to the support structure.

SUMMARY OF CERTAIN INVENTIVE ASPECTS

The embodiments disclosed herein each have several aspects no single one of which is solely responsible for the present disclosure's desirable attributes. Without limiting the scope of the present disclosure, its more prominent features will now be briefly discussed. After considering this discussion, and particularly after reading the section entitled "Detailed Description" one will understand how the features of the embodiments described herein provide advantages over existing methods of manufacturing large space habitats.

In one aspect, a fastener configured to temporarily secure a component to a support structure during installation of the component is provided. The fastener includes: a proximal portion configured to selectively engage and disengage a hole in the support structure; an intermediate portion including a plurality of retention arms, each of the retention arms having a flange, each of the retention arms configured to transition between a resting configuration and a compressed configuration, the plurality of retention arms configured to prevent the flange from traversing a hole in the component when the plurality of retention arms are in the resting configuration, the plurality of retention arms configured to allow the flange to traverse the hole in the component when the plurality of retention arms are in the compressed configuration; and a distal configured to guide traversal of the fastener through the hole in the component.

In some embodiments, the surface of the proximal portion includes threads configured to selectively engage and disengage a tapped surface of the hole in the support structure, and turning the fastener clockwise causes the threads of the proximal portion to selectively engage the tapped surface of the support structure.

In some embodiments, turning the fastener counterclockwise causes the threads of the proximal portion to selectively disengage the tapped surface of the support structure.

In some embodiments, the distal portion further includes a textured surface configured to facilitate a user to turn the fastener clockwise and counterclockwise.

In some embodiments, the plurality of retention arms are configured to prevent the flange from traversing the hole in the component when the component is moved from the proximal portion of the fastener towards the distal portion of the fastener.

In some embodiments, when the component is moved from the distal portion of the fastener towards the proximal portion of the fastener, the plurality of retention arms are configured to move towards a shank of the intermediate portion to allow the flange to traverse the hole in the component.

In some embodiments, the intermediate portion of the fastener includes a shank coupling the distal portion of the fastener to the proximal portion of the fastener.

In some embodiments, in the resting configuration, each of the plurality of retention arms forms an angle with the shank leaving a defined distance between the flange and the shank.

In some embodiments, in the resting configuration, each of the plurality of retention arms forms an angle with the shank such that a diameter of the intermediate portion increases from the distal portion of the fastener towards the proximal portion of the fastener.

In some embodiments, each of the flanges includes a contact surface substantially perpendicular to a longitudinal axis of the fastener.

In some embodiments, the contact surface is configured to support at least a portion of the weight of the component.

In some embodiments, the contact surface is configured to contact a surface of the component after the component is moved from the distal portion of the fastener to the proximal portion of the fastener.

In some embodiments, the distal portion further includes a tapered end configured to guide traversal of the fastener through the hole in the component.

In some embodiments, the support structure includes a panel of a spacecraft.

In another aspect, a system is provided. The system includes: a component configured to be secured to a support structure, where a first hole is defined in the component, and where the support structure includes a second hole; and a fastener including: a proximal portion configured to selectively engage and disengage the second hole of the support structure; an intermediate portion including a plurality of retention arms, each of the retention arms having a flange, each of the retention arms configured to transition between a resting configuration and a compressed configuration, the plurality of retention arms configured to prevent the flange from traversing a hole in the component when the plurality of retention arms are in the resting configuration, the plurality of retention arms configured to allow the flange to traverse the hole in the component when the plurality of retention arms are in the compressed configuration; and a distal portion configured to guide traversal of the fastener through the hole.

In some embodiments, the surface of the proximal portion includes threads configured to selectively engage and disengage a tapped surface of the hole in the support structure, and turning the fastener clockwise causes the threads of the proximal portion to selectively engage the tapped surface of the support structure.

In some embodiments, turning the fastener counterclockwise causes the threads of the proximal portion to selectively disengage the tapped surface of the support structure.

In some embodiments, the distal portion further includes a textured surface configured to facilitate a user to turn the fastener clockwise and counterclockwise.

In some embodiments, the retention arms are configured to prevent the flange from traversing the hole in the component when the component is moved from the proximal portion of the fastener towards the distal portion of the fastener.

In some embodiments, when the component is moved from the distal portion of the fastener to the proximal portion of the fastener, the retention arms are configured to move towards a shank of the intermediate portion to allow the flange to traverse the hole in the component.

In some embodiments, the intermediate portion of the fastener includes a shank coupling the distal portion of the fastener to the proximal portion of the fastener.

In some embodiments, in the resting configuration, each of the plurality of retention arms forms an angle with the shank leaving a defined distance between the flange and the shank.

In some embodiments, in the resting configuration, each of the plurality of retention arms forms an angle with the shank such that a diameter of the intermediate portion increases from the distal portion of the fastener towards the proximal portion of the fastener.

In some embodiments, each of the flanges includes a contact surface substantially perpendicular to a longitudinal axis of the fastener.

In some embodiments, the contact surface is configured to support at least a portion of the weight of the component.

In some embodiments, the contact surface is configured to contact a surface of the component after the component is moved from the distal portion of the fastener to the proximal portion of the fastener.

In yet another aspect, a method of securing a component to a support structure during installation of the component is provided. The method includes: installing a fastener into the support structure by turning a distal portion of the fastener clockwise such that threads of a proximal portion of the fastener engage a first tapped surface of the support structure; inserting a distal portion of the fastener through a first hole defined in the component; compressing a plurality of retention arms of an intermediate portion of the fastener such that the retention arms transition from a resting configuration to a compressed configuration; inserting the intermediate portion of the fastener through the first hole defined in the the component; releasing the retention arms of the intermediate portion of the fastener such that the retention arms transition from the compressed configuration to the resting configuration; and releasing the component such that a flange of each of the retention arms of the intermediate portion of the fastener engages the component.

In some embodiments, the method further includes: installing a first bolt through a second hole defined in the component into a second tapped surface of the support structure; removing the fastener from the first tapped surface of the support structure; and installing a second bolt through the first hole defined in the component into the first tapped surface of the support structure.

In some embodiments, removing the fastener from the first tapped surface of the support structure includes turning the distal portion of the fastener counterclockwise such that the threads of the proximal portion of the fastener disengage the first tapped surface of the support structure.

In some embodiments, installing the fastener into the support structure includes turning the distal portion of the fastener clockwise such that the threads of the proximal portion of the fastener engage the first tapped surface of the support structure.

In some embodiments, the distal portion of the fastener includes a textured surface configured to facilitate the turning of the fastener clockwise and counterclockwise.

In some embodiments, the method further includes supporting at least a portion of the weight of the component using the fastener during installation of the first bolt.

In some embodiments, the support structure forms a ceiling or part of a ceiling, each of the retention arms includes a flange formed on one end of the retention arm, each of the flanges having a contact surface, and the method further includes supporting at least a portion of the weight of the component using the contact surfaces of the fastener during installation of the first bolt.

In some embodiments, the support structure forms a portion of a spacecraft.

In some embodiments, the method further includes removing the proximal portion of the fastener through the first hole defined in the component as the threads of the proximal portion of the fastener selectively disengage the first tapped surface of the support structure.

In still yet another aspect, a method of removing a component that was temporarily secured to a support structure is provided. The method includes: compressing a plurality of retention arms of an intermediate portion of a fastener such that the retention arms transition from a resting configuration to a compressed configuration; removing the component from a proximal portion of the fastener over the intermediate portion of the fastener towards a distal portion of the fastener such that the intermediate portion of the fastener exits a hole defined in the component; and removing the component from the distal portion of the fastener.

In some embodiments, the method further includes uninstalling a first bolt from a second hole defined in the component and a corresponding tapped surface of the support structure.

In some embodiments, the method further includes removing the fastener from the support structure.

In some embodiments, removing the fastener from the support structure includes turning the distal portion of the fastener counterclockwise such that threads of the proximal portion of the fastener disengage the support structure.

In some embodiments, removing the fastener from the support structure includes engaging a textured surface on the distal portion of the fastener to turn the distal portion of the fastener counterclockwise.

In some embodiments, the method further includes supporting at least a portion of the weight of the component using the fastener prior to compressing the plurality of retention arms.

In some embodiments, the support structure forms a ceiling or part of a ceiling, each of the plurality of retention arms includes a flange formed on one end of the retention arm, each of the flanges having a contact surface, and the method further includes supporting at least a portion of the weight of the component using the contact surfaces of the fastener prior to compressing the plurality of retention arms.

In some embodiments, the support structure forms a portion of a spacecraft.

In some embodiments, the method further includes releasing the plurality of retention arms of the intermediate portion of the fastener such that the plurality of retention arms transition from the compressed configuration to the resting configuration.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. The relative dimensions and proportions as shown are not intended to limit the present disclosure. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Figure 1:
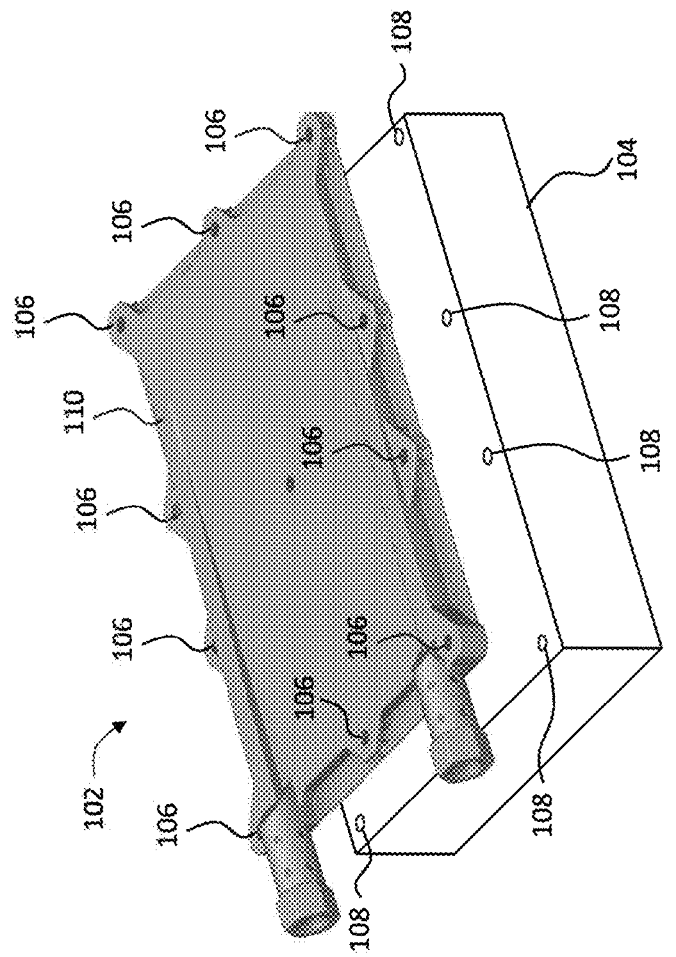
FIG. 1 is a perspective view of two components that can be fastened together using a plurality of fasteners according to an embodiment of the present disclosure.

Manufacturing and assembling structures, equipment, and/or machines (such as spacecraft, aircraft, automobiles, etc.) often involves fastening components together and/or to a structure, for example a support structure or a frame. For example, a cold plate may be fastened to a heat generating component using one or more bolts that are threaded into corresponding tapped holes. This fastening of components may be performed numerous times during the manufacturing or assembly of these items.

Often, the fastening of components may be performed manually by one or more operators. Certain constraints on the manufacturing process may make the fastening of certain components more difficult. For example, heavy or large components may be difficult to hold in place while the fasteners (for example, bolts, nuts, etc.) are engaged to secure the components. Heavy components are often positioned on walls or ceilings and installed using pre-located fastener holes. To install the component, an operator will simultaneously hold the component in place while also placing fasteners to hold the component relative to the wall or ceiling. Thus, it may be necessary for two or more operators to install such large or heavy components.

Another difficult situation may be when there is limited space available to maneuver the component and/or hold the component in place. In these situations, there may not be enough space for more than one operator to secure the component, which may require specialized supporting equipment to hold the component in place while the fasteners can be installed.

Advantageously, the fasteners described herein can address one or more of the above problems by temporarily securing a component to a support structure. For example, the fastener can engage a hole in a component as the component is brought to an installation location. The surface of the support structure along with contact surfaces of the fastener can restrain movement of the component along the longitudinal axis of the fastener, thereby holding the component in place. This enables an operator to have both hands free to install and torque the final fasteners (for example, bolts). Advantageously, after the component is secured to the support structure using final fasteners, embodiments of fasteners according to the present disclosure can be uninstalled and replaced with final fasteners. Fasteners according to embodiments of the present disclosure can be uninstalled by disengaging the fasteners from the support structure and removing the fasteners, allowing for efficient and quick removal of the fasteners. Advantageously, the fasteners can be uninstalled from the support structure by simply rotating the fastener in a counter-clockwise direction by hand. In addition, fasteners according to embodiments of the present disclosure can allow for quick and efficient reversal of a component installation in the event the component needs to be uninstalled from a support structure before the fastener is uninstalled from the support structure. A component can be unsecured from the fastener and uninstalled from the support structure by compressing an element of the fastener by hand and disengaging the component from the fastener, allowing for efficient and quick reversal of the component installation on the support structure. In addition, no part of the fastener according to embodiments of the present disclosure remains in the support structure after the fastener is removed. This is in contrast to typical toggle studs, which include wall anchors having an outer sleeve that remains in place in the support structure even after a center portion of the toggle stud is removed. Further, fasteners according to embodiments of the present disclosure can advantageously temporarily secure a component to a support structure that is oriented at any angle relative to the user, for example a vertically-oriented support structure, a horizontally-oriented support structure, and a support structure that is not oriented vertically or horizontally. Fasteners according to embodiments of the present disclosure can support the weight of a component as it is being temporarily secured to a support structure independent of the orientation of the support structure.

Although embodiments of the present disclosure are described with reference to a fastener used in aerospace applications, the present disclosure is not limited to this context. Embodiments of fasteners according to the present disclosure can be implemented in any context where one component is secured to a structure using fasteners, including but not limited to aerospace, automobile, construction, shipbuilding, homebuilding, and art installation contexts.

FIG. 1 is a perspective view of a two components that can be fastened together using a plurality of fasteners according to an embodiment of the present disclosure. As shown in FIG. 1, a first component 102 is configured to be attached to a second component 104 using the fasteners. The first component 102 includes a plurality of first holes 106 through which fasteners can be inserted. The first holes 106 may be formed in the first component 102. In some embodiments, the first component 102 can include a housing 110 that houses one or more parts of the first component 102. In embodiments including the housing 110, one or more of the first holes 106 can be formed in the housing 110. The second component 104 includes a plurality of second holes 108 into which the fasteners can be inserted. The fasteners can be configured to be received through the second holes 108 to secure the first component 102 to the second component 104.

In some embodiments, the fasteners can include bolts that have threads configured to engage and disengage with a tapped surface formed on the internal surface of the second holes 108. In some embodiments, inserts may be placed into the second holes 108 with the tapped surface formed on the internal surface of the inserts. The heads of the bolts may be sized to be larger than the first holes 106 such that the bolt heads engage with a surface of the first component 102 around a perimeter of the first holes 106. For example, the first holes 106 may be formed in the housing 110 of the first component 102, such that the bolt heads engage with a surface of the housing 110 surrounding the first holes 106. The first component 102 can be configured to abut a surface of the second component 104, for example, via the housing 110.

In certain embodiments, the second component 104 can be a support structure onto which the first component 102 can be installed. For example, the second component 104 may be a panel of a spacecraft in a location at which the first component 102 is to be installed. In other cases, the second component 104 can be a frame or other structure configured to support the first component 102 during use.

As described above, there are many situations in which fastening two components 102, 104 together may be difficult. For example, it can be difficult to hold heavy or large components in place while the engaging the fasteners to secure the components. One technique for securing components under difficult conditions is to use specialized equipment and/or multiple technicians to position the components in place while fasteners are installed. However, these solutions are costly and may not be possible for all installation conditions.

Figure 2:
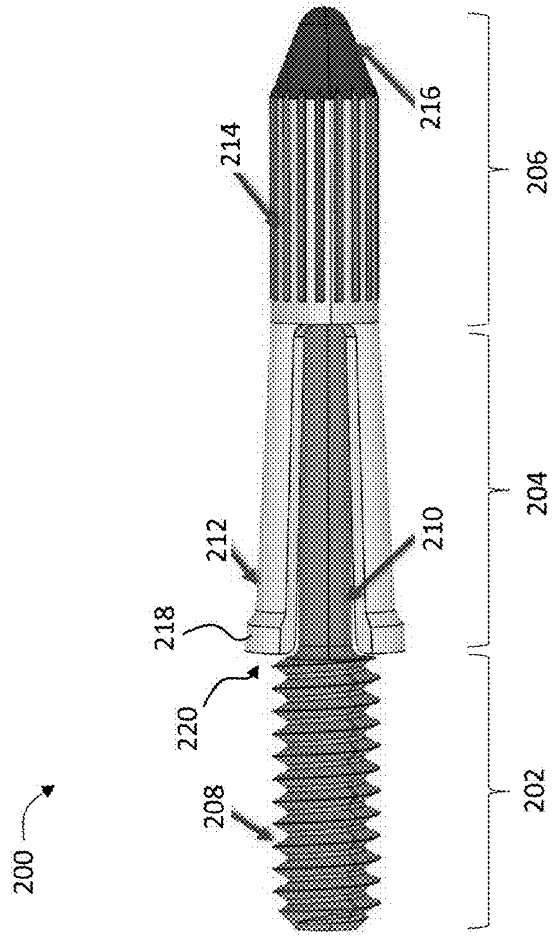
FIG. 2 is a view of a fastener according to an embodiment of the present disclosure.

Fasteners according to embodiments of the present disclosure can be used to temporarily secure two components 102, 104 to each other while the components 102, 104 are being fastened to each other. FIG. 2 is a view of a fastener 200 (also referred to as a "toggle stud") according to an embodiment of the present disclosure. With reference to FIG. 2, the fastener 200 includes a proximal portion 202, an intermediate portion 204, and a distal portion 206. In some embodiments, the proximal portion 202, the intermediate portion 204, and the distal portion 206 are formed to be integral with each other. For example, the proximal portion 202, the intermediate portion 204, and the distal portion 206 can be rigidly attached to each other and/or formed integrally as a monolithic structure. The proximal portion 202 includes threads 208 configured to selectively engage and disengage with a corresponding tapped surface (for example, the plurality of second holes 108 of FIG. 1).

The intermediate portion 204 includes a shank 210 and one or more retention arms 212 (also referred to as "springs"). In the embodiment of FIG. 2, the intermediate portion 204 includes two retention arms 212 arranged on opposing sides of the shank 210.

The retention arm 212 includes a first end that is attached to the shank 210 at a location near the interface between the intermediate portion 204 and the distal portion 206. The retention arm 212 has a second end located near the interface between the proximal portion 202 and the intermediate portion 204. In some embodiments, each of the retention arms 212 includes a flange 218 at the second end.

The retention arms 212 are configured to transition between a resting configuration and a compressed configuration. In the resting configuration, each of the retention arms 212 may form an angle with the shank 210 leaving a defined amount of clearance between an internal surface of the retention arm 212 and the shank 210. This angle of the retention arms 212 positions the flanges 218 at a defined distance away from the shank 210. This defined distance is larger than the diameter of a hole in the component to be held in place by the fastener 200. Because the distance between a flange 218 and the shank 210 in the resting configuration is larger than the diameter of hole in the component to be fastened, the flanges 218 cannot traverse a hole (for example, cannot pass through a hole from one side to the opposite side of the hole) in the component in the resting configuration.

In some embodiments, the retention arms 212 are spring-loaded. For example, the retention arms 212 can be configured to return to the resting configuration when external forces are not applied to the retention arms 212. When a force is applied to the retention arms 212 towards the shank 210, the retention arms 212 may move, flex, or bend in the direction of the force. When the applied force is greater than a threshold force, the force can move the retention arms 212 from the resting configuration into the compressed configuration. In one non-limiting embodiment, a collar including the retention arms 212 is positioned around the shank 210 and applying a radially-directed force to any of the retention 212 causes the retention arm 212 to move, flex, or bend toward the shank 210. In another non-limiting embodiment, the shank 210 and the retention arms 212 are integrally formed in a monolithic structure formed of a material, such as but not limited to plastic or metal, that permits the retention arms 212 to move, flex, or bend toward the shank 210. In still another non-limiting embodiment, the retention arms 212 are formed of a flexible material that is overmolded onto the shank 210 such that distal ends of the retention arms 212 are flexibly coupled to the shank 210. It will be understood that other mechanisms for spring-loaded retention arms 212 can be suitably implemented in embodiments of the present disclosure.

In the compressed configuration, the flanges 218 can traverse the hole in the component. For example, when the flanges 218 are compressed towards the shank 210 by reducing or eliminating the defined amount of clearance between the flanges 218 and the shank 210, the distance between a flange 218 and the shank 210 can be reduced to less than the diameter of the hole in the component. This allows the flange 218 to traverse the hole in the component (or vice versa) in the compressed configuration. Thus, when the component is moved from the distal portion 206 of the fastener 200 towards the proximal portion 202 of the fastener 200, the retention arms 212 are configured to move towards the shank 210 of the intermediate portion 204 to allow the flange 218 to traverse the hole in the component.

The distal portion 206 can be configured to guide traversal of the fastener 200 through the hole in the component. The distal portion 206 can include a substantially cylindrical section. In some non-limiting examples, the distal portion 206 includes a tapered end 216. The tapered end 216 can be configured to guide traversal of the fastener 200 through the hole in the component. In some embodiments of the present disclosure, the cylindrical section of the distal portion 206 includes a textured surface 214. The textured surface 214 can be configured to enable a user to turn the fastener 200 clockwise (for example, turn the fastener 200 into the page of FIG. 2). The textured surface 214 can also be configured to enable a user to turn the fastener 200 counterclockwise (for example, turn the fastener 200 out of the page of FIG. 2). In some embodiments, the textured surface 214 can include a knurled surface. It will be understood, however, that the textured surface 214 can include any texture that provides sufficient friction to enable a user to turn the fastener 200 to engage and disengage a surface.

Turning the fastener 200 clockwise causes the threads 208 of the proximal portion 202 to selectively engage the corresponding tapped surface formed on the internal surface of the second holes 108, while turning the fastener 200 counterclockwise causes the threads 208 of the proximal portion 202 to selectively disengage the corresponding tapped surface formed on the internal surface of the second holes 108.

In some embodiments, the proximal portion 202 of the fastener 200 can be formed without threads and the internal surface of the second holes 108 may not be tapped. In these embodiments, the proximal portion 202 of the fastener 200 can be temporarily secured within the internal surface of the second hole 108 using other fastening techniques. For example, in some embodiments, the proximal portion 202 of the fastener 200 can be temporarily secured within the internal surface the second hole 108 using a friction fit. In another example embodiment, the proximal portion 202 of the fastener 200 can include screw-like threads configured to engage with an untapped internal surface of the second hole 108. In still other embodiments, the proximal portion 202 of the fastener 200 can include an expending mechanism configured to expand when inserted in an untapped internal surface of the second hole 108 to secure the fastener within the second hole 108.

Figure 3:
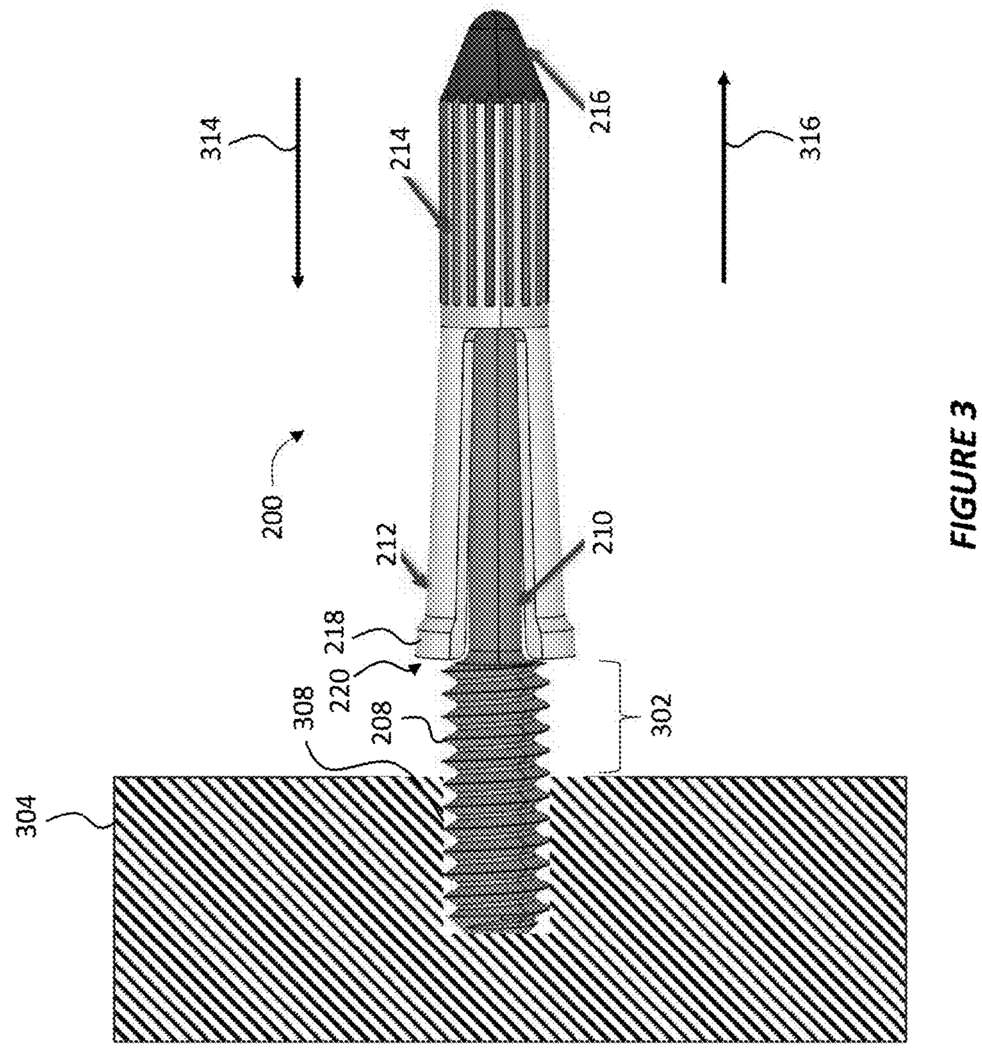
FIG. 3 is a view of a fastener installed into a support structure according to an embodiment of the present disclosure.

FIG. 3 is a view of a fastener 200 installed into a support structure 304 according to an embodiment of the present disclosure. In some embodiments, the support structure 304 may be a panel of a spacecraft to which a first component 102 is configured to be installed. The support structure 304 includes a hole 308. The hole 308 can include a tapped surface. The threads 208 of the proximal portion 202 can be configured to be engaged and disengaged with the tapped surface of the hole 308. As described above, it will be understood that the hole 308 need not include a tapped surface.

As shown in FIG. 3, the fastener 200 can be installed in the hole 308 of the support structure 304. To install the component onto the fastener 200, the hole of the component can be installed onto the fastener 200 by sliding the component along the fastener 200. For example, a user can bring a first surface of the component toward the distal portion 202 of the fastener 200, align a first side of a hole of the component with distal portion 202 (for example, by aligning the first side of the hole of the component with the tapered end 216 of the distal portion 202, if included), and engage the first surface of the component with the distal portion 202 (for example, engage the tapered end 216, if included) as the component is moved toward the proximal portion 202 of the fastener 200.

The user can continue to move the component towards the proximal portion 202 of the fastener 200, such that the hole of the component moves from the distal portion 206 to the intermediate portion 204 and towards the flanges 218. The retention arms 212 are in the resting confirmation when the user begins moving the component towards the intermediate portion 204. The angle of the retention arms 212 can form a tapered shape (for example, the diameter of the intermediate portion 204 increases from the distal portion 206 towards the proximal portion 202) such that sliding the hole of the component from the distal portion 206 of the fastener 200 towards the proximal portion 202 results in compression of the retention arms 212. The retention arms 212 are spring loaded such that once the hole in the component passes the flanges 218, the retention arms 212 will spring back into the resting configuration.

The flanges 218 also include a contact surface 220 that is configured to prevent the hole in the component from moving back towards the distal portion 206 without manually compressing the flanges 218. As shown in FIGS. 2 and 3, the contact surfaces 220 may face the proximal portion 202 of the fastener 200. For example, the contact surfaces 220 may be substantially perpendicular to a longitudinal axis of the fastener 200. In some embodiments, each of the contact surfaces 220 can be configured to temporarily support at least a portion of the weight of the first component 102 during installation of the first component 102. For example, when the support structure 304 forms a ceiling, a portion of the weight of the first component 102 can be supported by the contact surfaces 220. In other embodiments, such as when the support structure 304 forms a wall, a portion of the weight of the first component 102 may be supported by the proximal portion 202 (for example, via the threads 208) of the fastener 200.

In still other embodiments, the support structure 304 is not oriented at a vertical or a horizontal orientation. Advantageously, fasteners according to embodiments of the present disclosure can be configured to temporarily support at least some portion of the weight of the first component 102 when the support structure is oriented at any angle relative to a user installing the first component 102. The contact surfaces 220 of the flanges 218 and a surface of the support structure 304 can restrain movement of the first component 102 along the longitudinal axis of the fastener 200. Depending on the orientation of the support structure 304 and the fastener 200, the weight of the component can be distributed between one or more of: the surface of the support structure, the proximal portion 202 of the fastener 200, and the contact surfaces 220 of the flanges 218.

Advantageously, the fastener 200 engages the hole 106 in the first component 102 as the first component 102 is brought to the installation location. The surface of the support structure 304 along with the contact surfaces 220 of the flanges 218 restrain movement of the first component 102 along the longitudinal axis of the fastener 200, thereby holding the first component 102 in place. This enables the operator to have both hands free to install and torque the final fasteners (for example, bolts).

The fastener 200 can be installed into the hole 308 while leaving a gap 302 between a surface of the support structure 304 and the flanges 218 of the retention arms 212. The gap 302 may be larger than a thickness of the portion of the first component 102 through which the first holes 106 are formed. This enables the first hole 106 of the first component 102 to be slid onto the distal portion 206, over the retention arms 212, and into the gap 302. As the first hole 106 is slid over the retention arms 212, the first hole 106 can compress the retention arms 212 into the compressed configuration, thereby allowing the first hole 106 to traverse the retention arms 212. Once the first hole 106 is slid into the gap 302, the retention arms 212 are configured to return to the resting configuration, such that the flanges 218 prevent the first component 102 from moving back towards the distal portion 206 of the fastener 200.

While FIG. 3 illustrates an embodiment in which the support structure 304 is a panel that forms a vertical wall, the support structure 304 may be arranged in other locations or have other orientations, such as but not limited to a panel that forms a ceiling of a spacecraft. When the support structure 304 is formed as part of the ceiling, the weight of the first component 102 can be at least partially supported by the contact surface 220 of the flanges 218. This can enable the first component 102 to be held in place using one or more fasteners 200, such that specialized equipment or additional operators are not required for installation.

Figure 4:
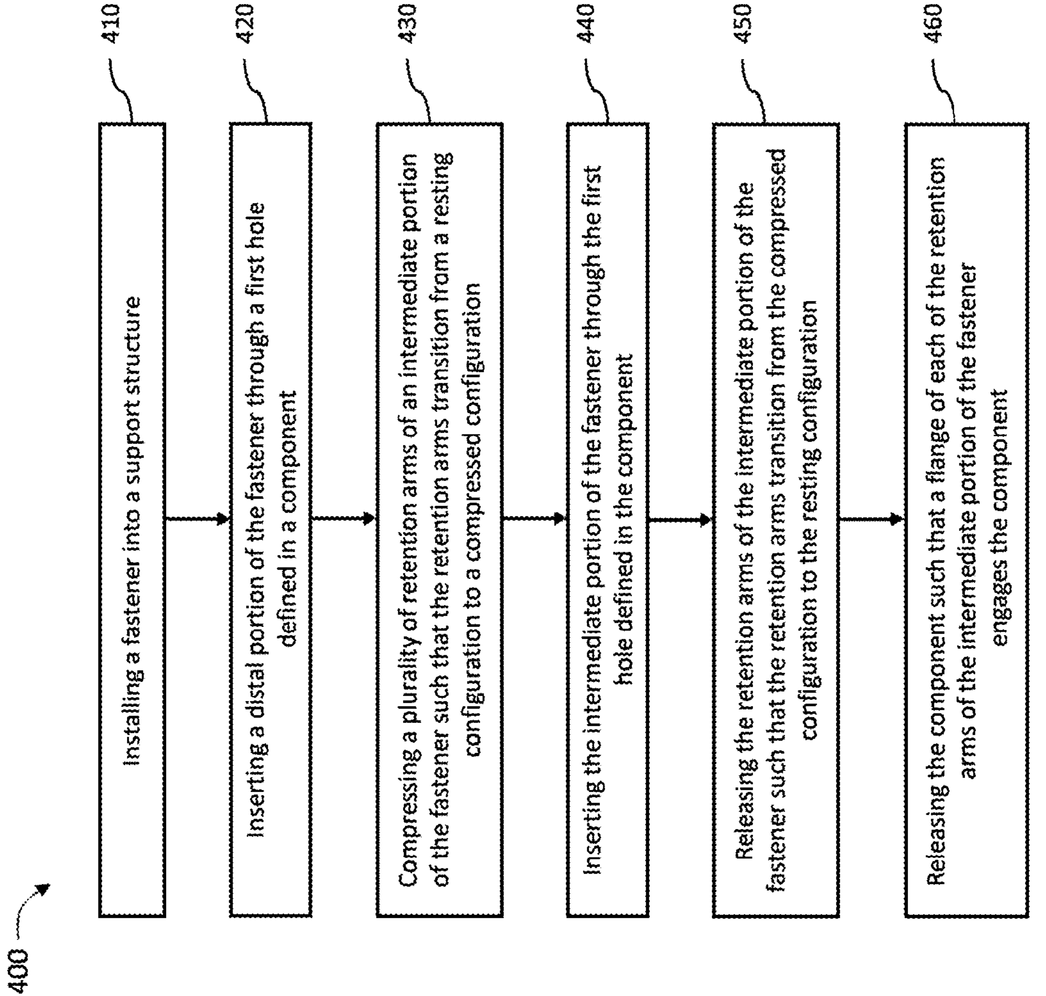
FIG. 4 is a flowchart illustrating a method of securing a component to a support structure during installation of the component according to an embodiment of the present disclosure.

FIG. 4 is a flowchart illustrating a method 400 of securing a component to a support structure during installation of the component according to an embodiment of the present disclosure. The support structure can be a panel or part of a panel. The method 400 can be used to secure any component such as the first component 102 of FIG. 1 using a fastener such as the fastener 200 of FIGS. 2 and 3 during installation of the first component 102 onto a support structure such as the support structure 304 of FIG. 3.

At block 410, the method 400 involves installing a fastener into a support structure. The support structure can be a panel or part of a panel. The installing of the fastener can be performed by turning a distal portion of the fastener clockwise such that threads of a proximal portion of the fastener engage a hole of the support structure. The hole can include a tapped surface. An insert including a tapped surface can be received in the hole.

At block 420, the method 400 involves inserting a distal portion of the fastener through a first hole defined in the component. For example, this can include moving (for example, sliding) a component such that the distal portion of the fastener enters a first hole defined in the component. The first hole may be defined in a housing of the component. For example, the component can be moved in the direction of the arrow 314 shown in FIG. 3.

At block 430, the method 400 involves compressing a plurality of retention arms of an intermediate portion of the fastener such that the retention arms transition from a resting configuration to a compressed configuration. For example, the act of sliding of the component over the intermediate portion of the fastener can compress the retention arms.

At block 440, the method 400 involves inserting the intermediate portion of the fastener through the first hole defined in the component. In some embodiments, the insertion of the intermediate portion of the fastener through the first hole defined in the component can result in the compression of the retention arms.

At block 450, the method 400 involves releasing the retention arms of the intermediate portion of the fastener such that the retention arms transition from the compressed configuration to the resting configuration.

At block 460, the method 400 involves releasing the component such that a flange of each of the retention arms of the intermediate portion of the fastener engages the component.

In some embodiments, the method 400 can involve installing a first bolt or other fastener through a second hole defined in the component into a second hole of the support structure. The second hole may be defined in the housing of the component. The second hole of the support structure may include a tapped surface. For example, any fastener designed to secure the component to the support structure can be installed through the second hole defined in the component into the second hole of the support structure. Example fasteners include but are not limited to bolts, screws, and nails. Additional bolts or other fasteners can be installed through any holes defined in the component not occupied by fasteners. Since the temporary fastener can temporarily secure the component to the support structure in a fixed orientation and spacing relative to the support structure, an operator can more easily install final bolts or fasteners to install the component onto the support structure.

In some embodiments, the method 400 can also involve removing the fastener from the first tapped surface of the support structure and installing a second bolt or other fastener through the first hole defined in the component into the first tapped surface of the support structure.

In some embodiments, removing the fastener from the first tapped surface of the support structure can include turning the distal portion of the fastener counterclockwise such that the threads of the proximal portion of the fastener disengage the first tapped surface of the support structure.

In some embodiments, installing the fastener into the support structure can include engaging a textured surface on the distal portion of the fastener to turn the distal portion of the fastener clockwise. The textured surface can include a knurled surface.

In some embodiments, the method 400 can also involve supporting at least a portion of the weight of the component using the fastener during installation of the first bolt.

In some embodiments, the support structure can form a ceiling or part of a ceiling, and each of the retention arms can include a flange formed on one end of the retention arm. Each of the flanges can have a contact surface. The method 400 can further involve supporting at least a portion of the weight of the component using the contact surfaces of the fastener during installation of the first bolt. Thus, the weight of the component can be transferred through the retention arms in a direction substantially parallel to the longitudinal axes of the retention arms.

In some embodiments, the support structure can form a wall or part of a wall, and each of the retention arms can include a flange formed on one end of the retention arm. Each of the flanges can have a contact surface. The method 400 can further involve restraining movement of the component along the longitudinal axis of the fastener between the contact surfaces of the flanges and a surface of the support structure. The weight of the component can be supported by the proximal portion 202 (for example, via the threads 208) of the fastener 200.

In some embodiments, the method 400 can involve removing the proximal portion of the fastener through the first hole defined in the component as the threads of the proximal portion of the fastener selectively disengage the corresponding tapped surface of the support structure.

In some embodiments, the method 400 can involve installing the component in or on a spacecraft, where the support structure forms a portion of the spacecraft.

In some embodiments, the method 400 can involve removing the component from a spacecraft, where the support structure forms a portion of the spacecraft.

Figure 5:
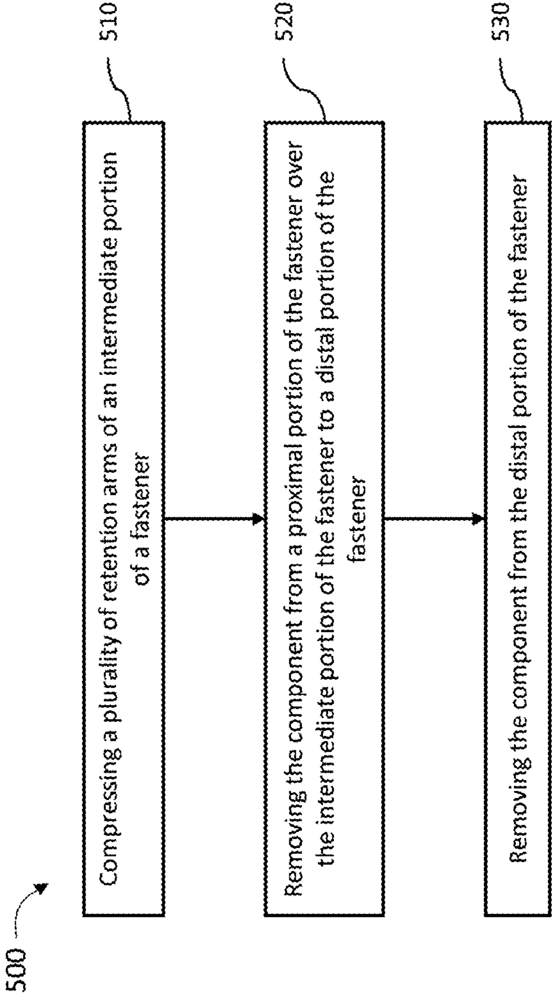
FIG. 5 is a flowchart illustrating a method of removing a component that was temporarily secured to a support structure according to an embodiment of the present disclosure.

FIG. 5 is a flowchart illustrating a method 500 of removing a component that was temporarily secured to a support structure according to an embodiment of the present disclosure. The support structure can be a panel or part of a panel. The method 500 can be used to remove any component such as the first component 102 of FIG. 1 from a fastener such as the fastener 200 of FIGS. 2 and 3. A user may remove the component that is temporarily secured to the support structure for various reasons, including but not limited to removing a component that was accidentally installed in an incorrect location, removing a component that was accidentally secured to an incorrect support structure, and removing a component that was damaged or broken during installation.

At block 510, the method 500 involves compressing a plurality of retention arms of an intermediate portion of a fastener. The compression of the retention arms transitions the retention arms from a resting configuration to a compressed configuration.

At block 520, the method 500 involves removing the component from a proximal portion of the fastener over the intermediate portion of the fastener to a distal portion of the fastener such that the intermediate portion of the fastener exits a hole defined in the component. The hole may be defined in a housing of the component. For example, removing the component can involve moving (for example, sliding) the component from the proximal portion of the fastener toward the distal portion of the fastener such that the intermediate portion of the fastener exits a hole defined in the component. For example, the component can be moved in the direction of the arrow 316 shown in FIG. 3.

At block 520, the method 500 involves removing the component from the distal portion of the fastener.

In some embodiments, the method 500 can also involve uninstalling a first bolt from a second hole defined in the component and a corresponding tapped surface of the support structure. The second hole may be defined in the housing of the component.

In some embodiments, the method 500 can also involve removing the fastener from a tapped surface of the support structure. Removing the fastener from the tapped surface of the support structure can include turning the distal portion of the fastener counterclockwise such that threads of the proximal portion of the fastener disengage the corresponding tapped surface of the support structure. Removing the fastener from the tapped surface of the support structure can also include engaging a textured surface on the distal portion of the fastener to turn the distal portion of the fastener counterclockwise. The textured surface can include a knurled surface.

In some embodiments, the method 500 can further involve supporting at least a portion of the weight of the component using the fastener prior to compressing the plurality of retention arms.

In some embodiments, the support structure can form a ceiling or part of a ceiling and each of the retention arms can include a flange formed on one end of the retention arm. Each of the flanges can have a contact surface. The method 500 can further involve supporting at least a portion of the weight of the component using the contact surfaces of the fastener prior to compressing the plurality of retention arms.

While embodiments of the present disclosure are described with reference to temporarily securing a component to a support structure using a single fastener, it will be understood that a plurality of fasteners can be used to temporarily secure a component to a support structure. For example, in some embodiments, a first fastener and a second fastener are installed on the support structure. The component can be temporarily secured to the support structure by inserting a distal portion of a first fastener through a first hole defined in the component at the same time a distal portion of a second fastener is inserted through a second hole defined in the component. Steps 430, 440, 450 and 460 of the method 400 can be implemented for both the first fastener and the second fastener.

Terminology

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of securing a component to a support structure during installation of the component, the method comprising:

installing a fastener into the support structure by turning a distal portion of the fastener clockwise such that threads of a proximal portion of the fastener engage a first tapped surface of the support structure;

inserting a distal portion of the fastener through a first hole defined in the component;

compressing a plurality of retention arms of an intermediate portion of the fastener such that the retention arms transition from a resting configuration to a compressed configuration;

inserting the intermediate portion of the fastener through the first hole defined in the component;

releasing the retention arms of the intermediate portion of the fastener such that the retention arms transition from the compressed configuration to the resting configuration; and releasing the component such that a flange of each of the retention arms of the intermediate portion of the fastener engages the component.

2. The method of claim 1, further comprising:

compressing the plurality of retention arms of the intermediate portion of the fastener such that the retention arms transition from the resting configuration to the compressed configuration;

removing the component from the proximal portion of the fastener over the intermediate portion of the fastener towards the distal portion of the fastener such that the intermediate portion of the fastener exits the first hole defined in the component; and removing the component from the distal portion of the fastener.

3. The method of claim 2, further comprising removing the fastener from the support structure.

4. The method of claim 3, wherein removing the fastener from the support structure comprises turning the distal portion of the fastener counterclockwise such that threads of the proximal portion of the fastener disengage the support structure.

5. The method of claim 3, wherein removing the fastener from the support structure comprises engaging a textured surface on the distal portion of the fastener to turn the distal portion of the fastener counterclockwise.

6. The method of claim 2, further comprising uninstalling a first bolt from a second hole defined in the component and a corresponding tapped surface of the support structure.

7. The method of claim 2, further comprising supporting at least a portion of the weight of the component using the fastener prior to compressing the plurality of retention arms.

8. The method of claim 2, wherein:

the support structure forms a ceiling or part of a ceiling, each of the plurality of retention arms comprises a flange formed on one end of the retention arm, each of the flanges having a contact surface, and the method further comprises supporting at least a portion of the weight of the component using the contact surfaces of the fastener prior to compressing the plurality of retention arms.

9. The method of claim 2, wherein the support structure forms a portion of a spacecraft.

10. The method of claim 2, further comprising releasing the plurality of retention arms of the intermediate portion of the fastener such that the plurality of retention arms transition from the compressed configuration to the resting configuration.

11. The method of claim 1, further comprising:

installing a first bolt through a second hole defined in the component into a second tapped surface of the support structure;

removing the fastener from the first tapped surface of the support structure; and installing a second bolt through the first hole defined in the component into the first tapped surface of the support structure.

12. The method of claim 11, wherein removing the fastener from the first tapped surface of the support structure comprises turning the distal portion of the fastener counterclockwise such that the threads of the proximal portion of the fastener disengage the first tapped surface of the support structure.

13. The method of claim 11, further comprising supporting at least a portion of the weight of the component using the fastener during installation of the first bolt.

14. The method of claim 11, wherein:

the support structure forms a ceiling or part of a ceiling, each of the retention arms comprises a flange formed on one end of the retention arm, each of the flanges having a contact surface, and the method further comprises supporting at least a portion of the weight of the component using the contact surfaces of the fastener during installation of the first bolt.

15. The method of claim 1, wherein installing the fastener into the support structure comprises turning the distal portion of the fastener clockwise such that the threads of the proximal portion of the fastener engage the first tapped surface of the support structure.

16. The method of claim 15, wherein the distal portion of the fastener comprises a textured surface configured to facilitate the turning of the fastener clockwise and counterclockwise.

17. The method of claim 1, wherein the support structure forms a portion of a spacecraft.

18. The method of claim 1, further comprising removing the proximal portion of the fastener through the first hole defined in the component as the threads of the proximal portion of the fastener selectively disengage the first tapped surface of the support structure.

* * * * *